Figure 1:
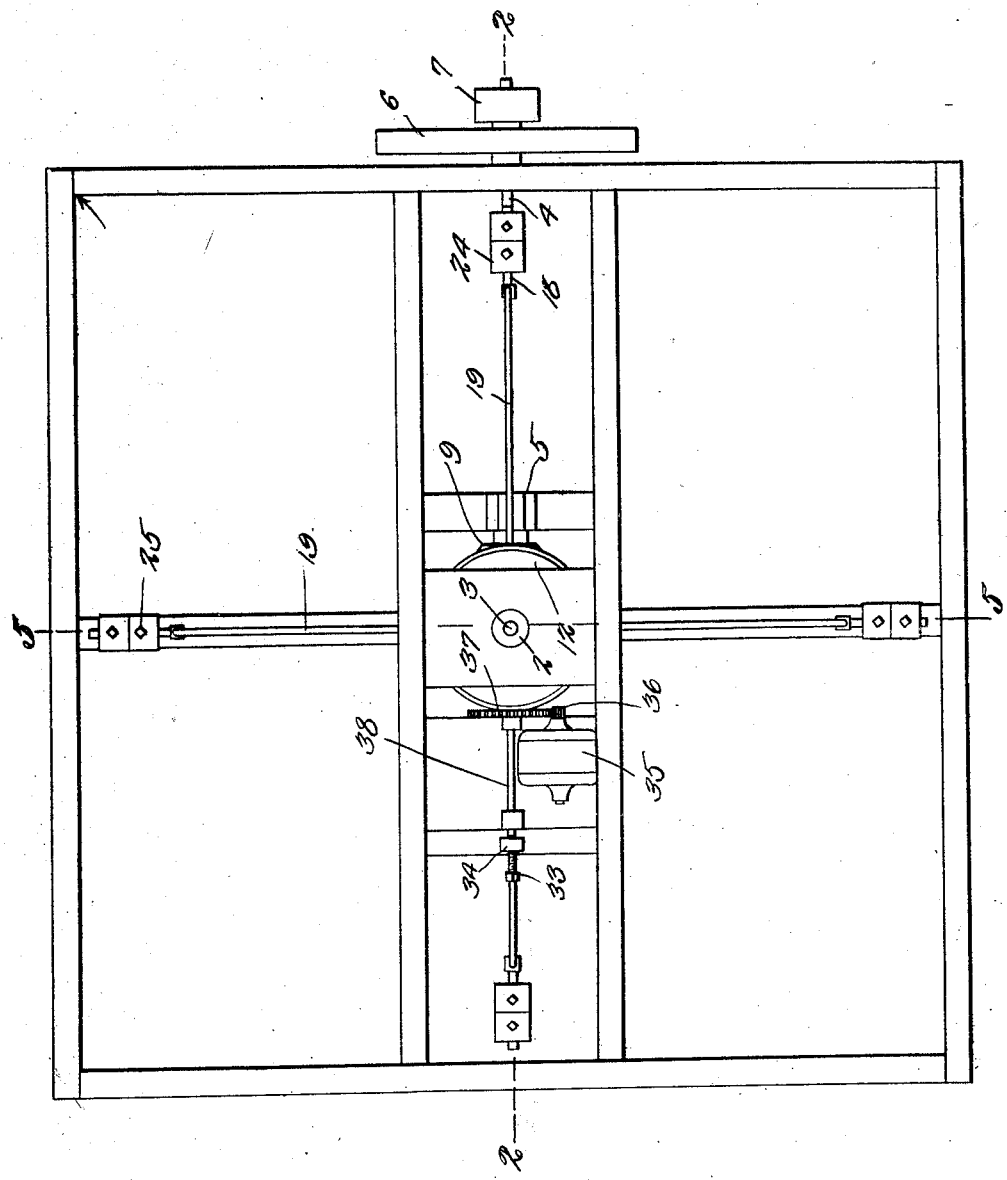

Sept. 22, 1925.　　　　　　　　　　　　　　　　　1,554,404
C. F. CHRISTOPHER
POWER TRANSMISSION MEANS
Filed Sept. 9, 1921　　　3 Sheets-Sheet 1

C. F. Christopher
Inventor,

By C. A. Snow & Co.
Attorneys.

Sept. 22, 1925.
C. F. CHRISTOPHER
POWER TRANSMISSION MEANS
Filed Sept. 9, 1921
1,554,404
3 Sheets-Sheet 2
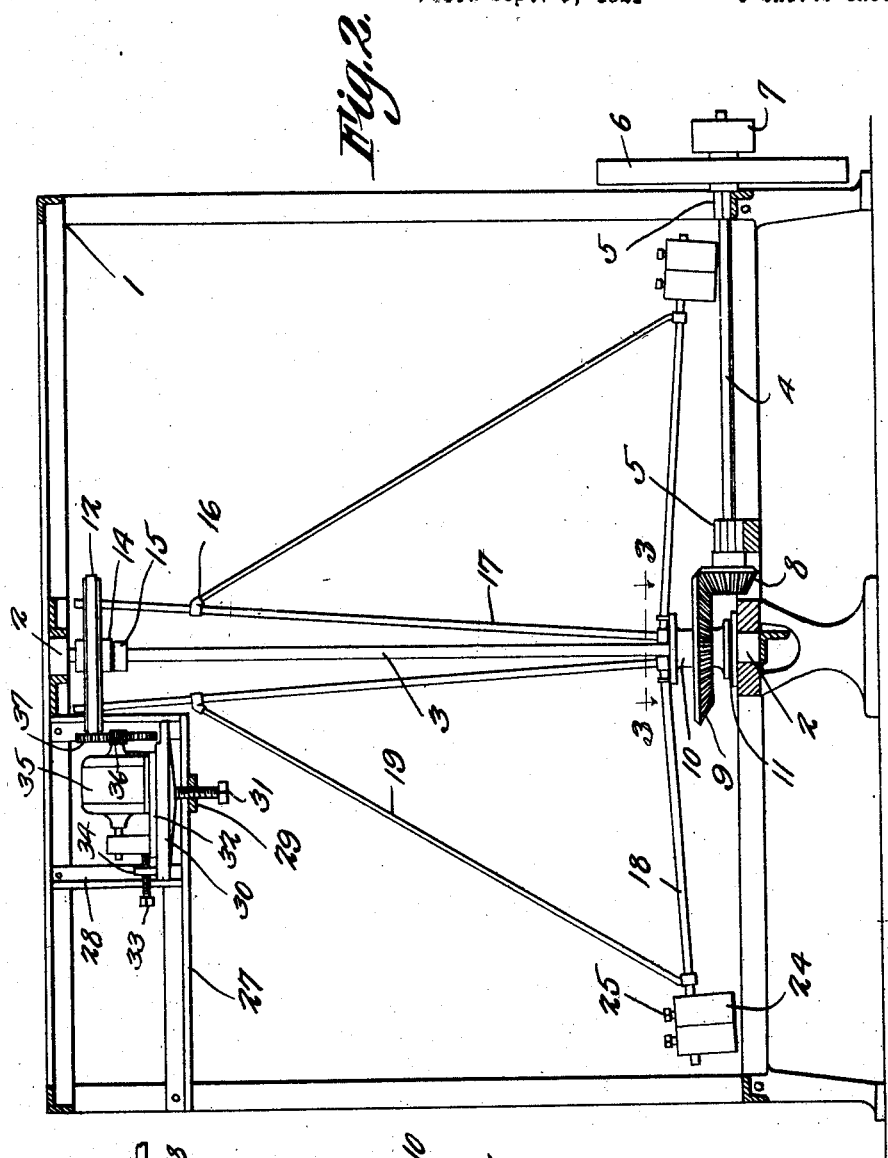
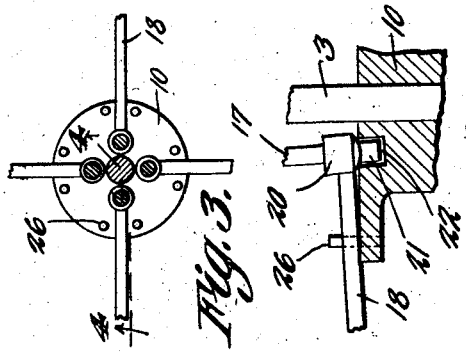
C. F. Christopher
Inventor

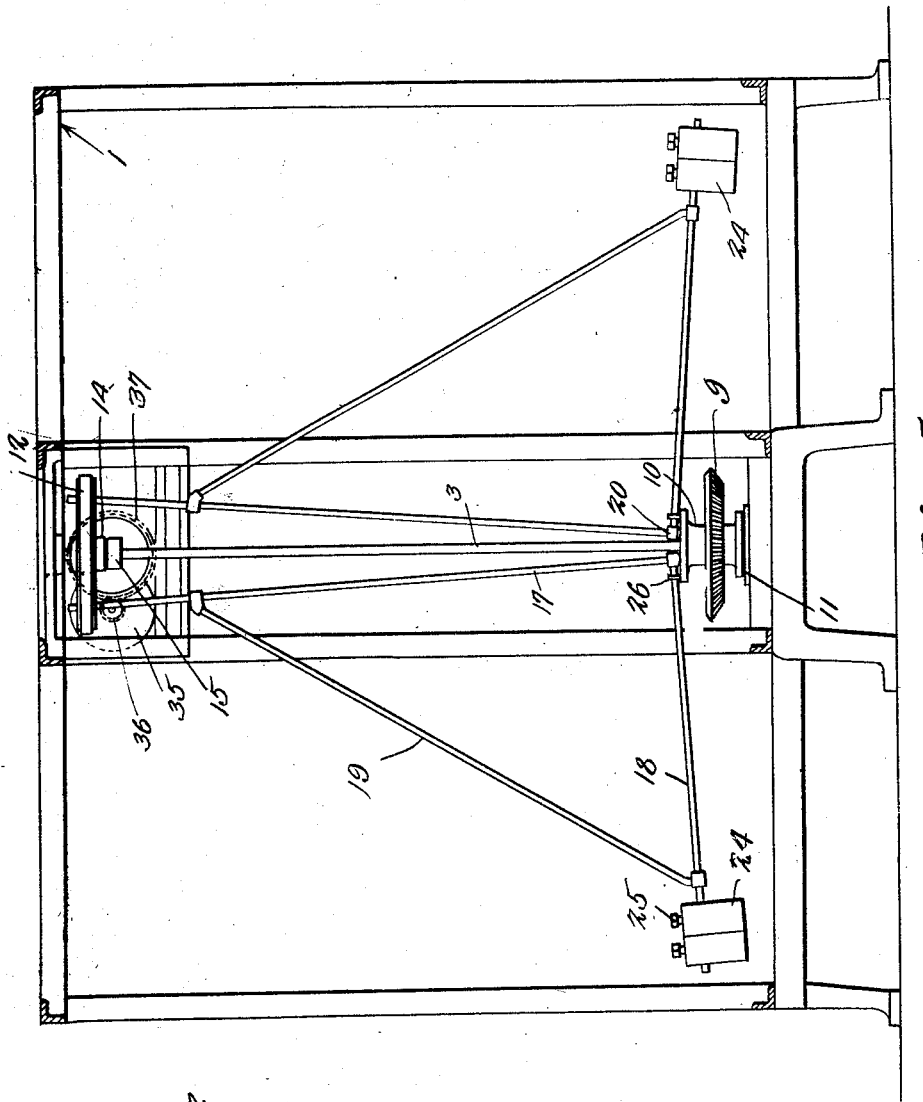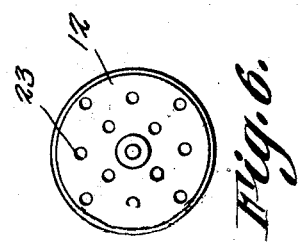

Patented Sept. 22, 1925.

1,554,404

UNITED STATES PATENT OFFICE.

CALVIN F. CHRISTOPHER, OF ASHEVILLE, NORTH CAROLINA, ASSIGNOR, BY DIRECT AND MESNE ASSIGNMENTS, OF THREE-FIFTHS TO FRANK J. BATES, OF ASHEVILLE, NORTH CAROLINA, AND OF ONE-FIFTH TO THE CHRISTOPHER CO. INC., OF MIAMI, FLORIDA, AND OF ONE-FIFTH TO STANDARD SECURITIES CO., OF ASHEVILLE, NORTH CAROLINA.

POWER-TRANSMISSION MEANS.

Application filed September 9, 1921. Serial No. 499,454.

*To all whom it may concern:*

Be it known that I, CALVIN F. CHRISTOPHER, a citizen of the United States, residing at Asheville, in the county of Buncombe and State of North Carolina, have invented a new and useful Power-Transmission Means, of which the following is a specification.

This invention is a power transmission means embodying a prime mover, a driven element from which power can be taken off, and mechanism interposed between the prime mover and said driven element whereby an equalizing or governing effect will be produced, the difference between the power applied and the power derived being no greater than the energy required to propel the interposed mechanism, and the construction being such that when the prime mover no longer exercises its function, the said driven element will be prevented from stopping too suddenly.

In the drawing:—Figure 1 is a plan; Figure 2 is a section on the line 2—2 of Figure 1; Figure 3 is a section on the line 3—3 of Figure 2; Figure 4 is a section on the line 4—4 of Figure 3; Figure 5 is a section on the line 5—5 of Figure 1; Figure 6 is a bottom plan of the disk.

The machine includes a frame 1 having bearings 2 wherein a vertical shaft 3 is journaled. A horizontal auxiliary shaft 4 is journaled in bearing 5 on the frame 1 and carries a fly wheel 6 and a pulley 7 or other means for transmitting power. A beveled pinion 8 is mounted on the inner end of the shaft 4 and meshes with a beveled gear 9 having a hub 10 which is fastened to the shaft 3. A thrust bearing 11 on the frame 1 cooperates with the hub 10 and supports the shaft 3.

A rotatable element or disk 12 is journaled on the shaft 3 and is not fastened to the shaft, the disk including a hub 14 cooperating with a thrust bearing 15 on the shaft 3.

Swinging members 16 are provided and are in the form of approximately triangular frames, as shown in Figure 2. Each swinging member 16 includes a standard 17, an outwardly projecting arm 18, and a brace 19 connected rigidly to the parts 17 and 18.

A connecting block 20 unites the lower end of the standard 17 with the inner end of the arm 18 and is mounted to rock on the hub 10 of the gear 9, the block having a stem 21 received loosely and pivotally in a recess 22 in the hub 10. For the sake of adjustment, there may be a plurality of openings 23 in the rotatable element 12, as shown in Figure 6, and in any of these openings, the upper ends of the standards 17 may be mounted pivotally. Weights 24 are mounted to slide for adjustment on the outer ends of the arms 18, the weights being held in place by set screws 25. The hub of the gear 9 is supplied with projections 26 between which the arms 18 of the swinging members 16 have limited movement.

Bars 27 project inwardly from one side of the frame 1 and are connected with the upper portion of the frame by guides 28, the bars being connected by a cross piece 29. A platform 30 is mounted to slide vertically in the guides 28 and may be raised and lowered by a screw 31 threaded into the cross piece 29. A carriage 32 is slidable on the platform 30 and may be advanced and retracted by a screw 33 threaded into a lug 34 on the platform 30.

A motor 35 is supported on the carriage 32. The shaft of the motor is provided with a pinion 36 meshing into a gear wheel 37 mounted on a shaft 38 journaled on the carriage 32. One vertical surface of the gear wheel 37 engages the periphery of the rotatable disk 12.

The train by which motion is transmitted through the machine, embodies the motor 35, the pinion 36, the gear wheel 37, the rotatable element 12, the members 16, the arms 18 of which cooperate with the projections 26 on the hub 10 of the gear wheel 9, to drive the gear wheel, the gear wheel 9 rotating the pinion 8 and the shaft 4, the shaft 4 turning the pulley 7, from which the power is taken off. The weights 24 have considerable momentum when the device is in motion, and prevent sudden stopping of the machine when the motor 35 is stopped.

In order to stop the machine, the carriage 32 is retracted by means of the screw 33 so that the vertical surface of the gear wheel 37 no longer bears against the periphery of the disk 12. The screw 31 is used to raise and lower the platform 30, and consequently the carriage 32 and the motor 35. By this operation, the axis of rotation of the pinion 36 may be shifted with respect to the disk 12, the speed of rotation of the disk being varied accordingly.

I claim:—

1. Power transmitting means comprising a frame, a substantially vertical shaft journaled in the frame, a member rotatable on the upper portion of the shaft, swinging frames pivoted at their upper ends in the rotatable member, means on the shaft for carrying the lower ends of the frames pivotally, weights on the swinging frames and located eccentrically with respect to the shaft, mechanism for driving the rotatable member, and means for taking off power from the shaft.

2. Power transmitting means constructed as set forth in claim 1, and further characterized by the fact that said driving mechanism embodies a motor and a friction wheel operated by the motor and engaging the periphery of the rotatable member, means for moving the motor in one direction, to space the friction wheel from the rotatable member and to stop operation, and means for moving the motor in another direction, thereby to adjust the distance between the center of rotation of the friction wheel and the point of contact between the friction wheel and the rotatable member, thereby to vary the speed at which the rotatable member is driven.

In testimony that I claim the foregoing as my own, I have hereto affixed my signature.

CALVIN F. CHRISTOPHER.